United States Patent [19]
Kumar et al.

[11] Patent Number: 5,038,305
[45] Date of Patent: Aug. 6, 1991

[54] PROGRAMMABLE CONTROLLER LINEAR TRANSDUCER INPUT MODULES

[75] Inventors: Shalabh Kumar, Kildeer; Vince Chow, Highland Park, both of Ill.

[73] Assignee: Microfast Controls Corp., Carol Stream, Ill.

[21] Appl. No.: 315,973

[22] Filed: Feb. 27, 1989

[51] Int. Cl.⁵ ...................... G01C 25/00; G06F 15/46
[52] U.S. Cl. .................................. 364/571.01; 73/1 J; 364/571.08; 364/560
[58] Field of Search ...................... 364/571.01–571.08, 364/560, 561, 474.35; 73/1 R, 1 J, DIG. 2; 367/13, 907

[56] References Cited
U.S. PATENT DOCUMENTS

| | | | |
|---|---|---|---|
| 4,364,027 | 12/1982 | Murooka | 364/571.05 |
| 4,391,124 | 7/1983 | Drost et al. | 364/571.02 |
| 4,481,596 | 11/1984 | Townzen | 364/571.05 |
| 4,608,657 | 8/1986 | Manome et al. | 364/571.01 |
| 4,642,636 | 2/1987 | Smith et al. | 364/571.01 |
| 4,669,052 | 5/1987 | Bianco | 73/1 R |
| 4,698,996 | 10/1987 | Kreft et al. | 73/1 J |
| 4,700,174 | 10/1987 | Sutherland et al. | 364/571.02 |
| 4,744,040 | 5/1988 | Kawata et al. | 364/561 |
| 4,805,126 | 2/1989 | Rodems | 364/571.01 |
| 4,807,161 | 2/1989 | Comfort et al. | 364/571.01 |
| 4,819,195 | 4/1989 | Bell et al. | 364/571.05 |
| 4,831,510 | 5/1989 | Dummermuth et al. | 364/560 |
| 4,845,649 | 7/1989 | Eckhardt et al. | 364/571.01 |

OTHER PUBLICATIONS

Data Acquisition & Control Interfaces for the IBM PC/XT/AT Compatibles, and Apple PC, Metrabyte, winter 1985/86, pp. 6-11 & 66-69.

Primary Examiner—Kevin J. Teska
Attorney, Agent, or Firm—Thomas R. Vigil

[57] ABSTRACT

The linear transducer input module is one of several modules mounted in a rack to form a programmable controller. The module's function is to provide position data from an externally located ultrasonic magnetostrictive linear transducer which is connected to some moving part of a machine to the programmable controller's processor module. The ultrasonic magnetostrictive linear transducer digital decoding circuitry (receiving circuitry) is located in the input module on the programmable controller input/output rack. A synchronizing circuit is provided in the module to synchronize the programmable controller's input fetch signals which input module circuitry. A user operable digital offset device is provided in the module for enabling an offset to be added to the ultrasonic magnetostrictive linear transducer position data by a user-selectable amount while accommodating different transducer lengths. User operable calibration circuitry is provided in the module for calibrating the module to ultrasonic magnetostrictive linear transducers with different characteristics. The linear transducer input module provides a numerical display of the digitally offset ultrasonic magnetostrictive linear transducer position data. The linear transducer input module also provides BCD coded output data which is easily connected to such devices as remote digital displays.

20 Claims, 4 Drawing Sheets

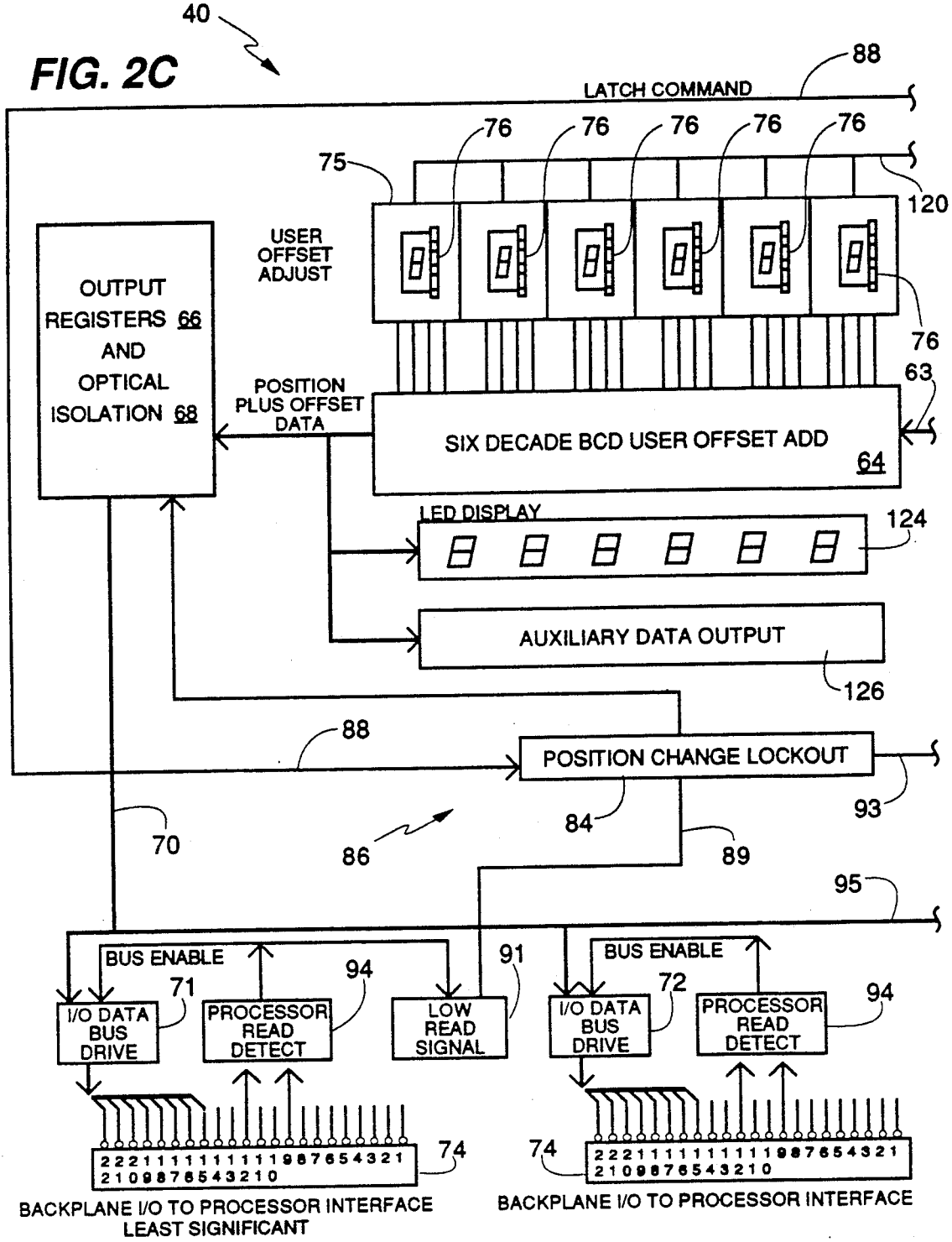

PROGRAMMABLE CONTROLLER LINEAR TRANSDUCER INPUT MODULES

BACKGROUND OF THE INVENTION

1. Field of the Invention

The invention relates to an improved method for coupling the position data from a ultrasonic magnetostrictive linear transducer to a programmable controller and for calibrating a linear transducer input module for use with transducers having different characteristics.

2. Description of the Prior Art

A typical programmable controller operates on a cycle where input data from input modules is coupled to a processor of the controller and is input by the processor into the user program, the user program is sequentially computed, and then output data are coupled from the processor module to the output modules. This input-compute-output process is continuously repeated. The elapsed time from input to output is usually several tens of milliseconds. Also, the processor sequentially reads the data from each input module and sequentially writes the data to each output module. The elapsed time to either read or write eight bits of input or output data from one input or to one output module is typically about 10 microseconds.

A typical ultrasonic magnetostrictive linear transducer has a stainless steel tube inside of which is a steel wire under tension. The transducer itself is mounted in a fixed location on a machine. When an electrical pulse of energy is applied to the wire, an electromagnetic wave is induced in the tube. A cylindrical magnet which is attached to a movable part of the machine encircles the transducer tube. When the wave enters the magnetic field caused by the encircling magnet, it creates a torsion wave which travels in both directions along the tube from the magnet location at a rate of approximately 9 micro-seconds per inch. At one end of the tube the wave is damped to prevent false waves from being detected At the other end the torsional wave is detected by a variety of methods to create a brief electrical pulse.

A typical electronic circuit arrangement for measuring distance will have an oscillator with an approximate 3.8 millisecond period to enable one to generate a brief transmit pulse, which initiates a torsional wave, to open a count gate for a counter chain which is counting pulses from a fixed-frequency oscillator, and to reset a predetermining transmit counter. When a pulse is received the predetermining transmit counter is incremented and another transmit pulse is sent immediately until the transmit counter has reached its predetermined count. When the predetermined count has been reached, the enabling signal for the fixed-frequency counter chain is removed, the count information is transferred to storage registers and the fixed frequency counters are reset. The storage registers contain the distance measurement.

In practice, no two magnetostrictive linear transducers have exactly the same torsional wave propagation time characteristics because of slightly different tube composition and other factors. The propagation time variation is approximately 0.7%. Because of the desire to maintain 0.001" accuracy and of the variation from one transducer to another, prior art measurement electronics had to match the frequency of the fixed-frequency counters to the individual transducer. In event of failure or damage to either the magnetostrictive linear transducer or the decoding electronics all components in such a system have to be replaced.

The matching of all components causes needless expense and complication for the user of this prior art scheme.

Even at the moderate update rate of 3.85 milliseconds per linear measurement, multi-byte output data from the magnetostrictive linear transducer decoding circuitry can be easily updated so that, without synchronization, the data will change from the time that a programmable controller can store the first byte to the time when succeeding bytes can be read, resulting in an output error. As an example, suppose that the magnetostrictive linear transducer decoding data can vary from 0 to 48000 with a four-foot linear transducer and that the programmable controller reads first the low eight bits, then the next highest eight bits, then the highest eight bits Also suppose that when the first eight bits is read the data is 31999, and the processor correctly reads 99 but before the processor can read the second byte, the data changes to 32000. The processor will then read 20 and the data that is stored is the incorrect value of 32099. To overcome this problem, a synchronization interface from the magnetostrictive linear transducer decoder to the programmable controller input modules is either incorporated into the magnetostrictive linear transducer decoder or added as an external module. The synchronization interface is designed to receive a digital transition from a programmable controller output module at its input and then freeze the value of the magnetostrictive linear transducer decoder's output data after a fixed amount of time, thereby enabling the programmable controller to read the correct data value.

One difficulty with this approach is the additional delay and programming overhead of having the programmable controller first output data and then read the input data. Another difficulty is that additional modules external to the programmable controller are required to convert the resolver shaft position to digital position and secondly, to synchronize the data to the programmable controller's input/output scan. In addition, the conventional input modules necessary to read the data into the programmable controller are, in themselves, expensive. Also, with rapidly changing input position data, from the time that an external synchronization circuit freezes the position data until such time that the programmable controller can input the data, the position may have changed so much that computed decisions based on the position data may have little value.

SUMMARY OF THE INVENTION

According to the teachings of the present invention a programmable controller is provided with a resolver decoder input module that occupies one or more bus connection slots in the programmable controller's backplane. The magnetostrictive linear transducer is wired to a small signal conditioning module which is, in turn wired to removable terminal blocks on top edge of the linear transducer input module. The function of the linear transducer input module is to initiate the transmit sequence of the magnetostrictive linear transducer and to then decode the "elapsed time from transmit to receive" into two or more bytes of BCD position data.

Additionally according to the invention, a user adjustable digital offset adjustment is provided to adjust the measurement reference point.

Further according to the invention, and what is an important advance over the prior art, is the incorporation into a linear transducer input module of user operable means for calibration to any magnetostrictive linear transducer connected to the input module. All the user needs to do is to move a switch on the top of the linear transducer to the calibrate mode and adjust a control until the LED display indicates the same number as the calibration number that appears on a label attached to the magnetostrictive linear transducer. The switch is then moved back to select the measurement mode and the linear transducer input module is ready for operation.

The LED display will then indicate true position plus any digital offset that the user may have entered.

Additionally according to the invention, the linear transducer decoder input module may provide an external auxiliary digital position output. The digital position data is optically isolated from the connection to the backplane.

Still further, when the processor reads the linear transducer input module's data, the processor sequentially reads data starting at the lowest module number until the data has been read from the highest numbered input module. Instead of depending on time delays from a signal sent by the processor to an output module to synchronize the linear transducer position decoding circuitry to the processor's scan, the linear transducer input module detects the processor's first read of the input module to inhibit the position data update until the end of the last read of the linear transducer input module. By synchronizing the inhibition of data updates to the actual processor input cycle, no additional circuitry is required and the position data sent by the linear transducer input module to the processor is the latest and most timely available.

Also, the input module has, according to the teachings of the present invention, user offset input means in the form of thumbwheel digit switches which enable a user to input a binary coded decimal offset which is added to the digitized data input generated from the linear transducer output.

BRIEF DESCRIPTION OF THE DRAWINGS

FIGS. 2A-2D are a schematic circuit diagram of the electrical circuit of a linear transducer input module constructed according to the teachings of the present invention.

DETAILED DESCRIPTION OF THE PREFERRED EMBODIMENT

Figure 1:
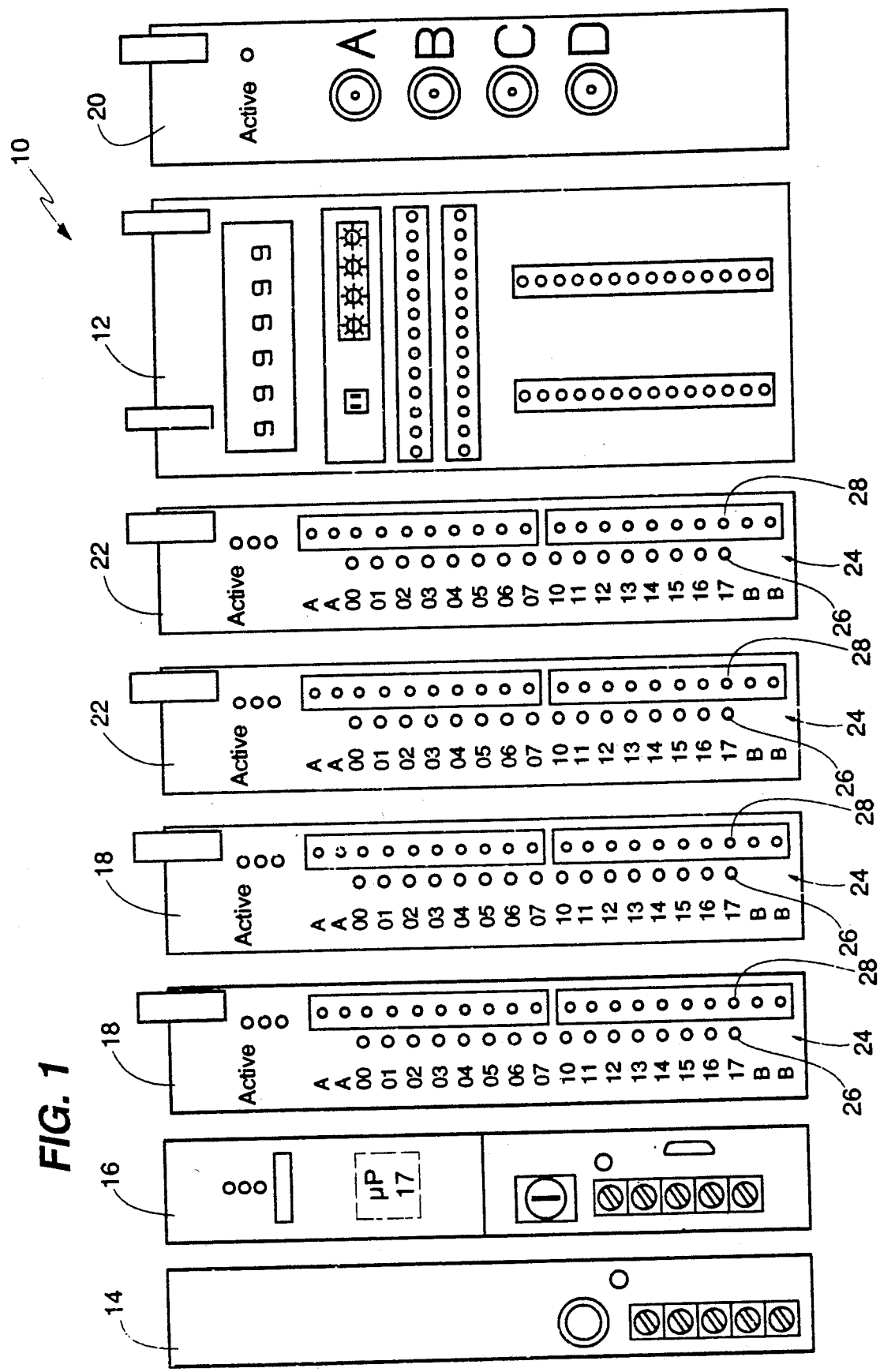
FIG. 1 is a front elevational view of a front panel of a programmable controller assembly (which is mounted in a rack of the assembly) and shows a front end of several output modules constructed according to the teachings of the present invention.

Referring now to the drawings in greater detail, there is shown in FIG. 1 a programmable controller 10 constructed according to the teachings of the present invention. The controller 10 includes a linear transducer input module 12 which is one of eight modules in a programmable controller system. The modules are carried upright in two side-by-side arrangements in a rack (not shown). Besides the linear transducer input module 12, the controller system also includes a power supply module 14, a processor module 16, two input modules 18, an analog load cell module 20, and two output modules 22. All of the modules are confined between spaced apart sidewalls of the rack (not shown). The rack may be of different sizes so that a greater or lesser number of input/output modules can be accommodated.

The processor module 16 is connected to the input modules 12, 18, and 20 and to the output modules 22 through a backplane printed circuit board (not shown) that is physically located beneath all of the modules 12, 14, 16, 18, 20, and 22.

The power supply module 14, the processor module 16 having a processor 17 therein, the input modules 12, 18, and 20, and the output modules 22 are formed by printed circuit boards (not shown) which carry electronic components that are partially covered around the outside of the printed circuit boards. The modules 12, 14, 16, 18, 20, and 22 slide into slots formed by upright closely spaced guides (not shown) in the rack, and in this position, their printed circuit boards each present a back edge that engages an edge connector (not shown) mounted on the backplane printed circuit board.

Columns 24 of LED (light emitting diode) status indicators 26 are physically located next to their respective terminal block receptacles 28 on a front face of each of the input modules 18 and of the output modules 22 on the upper front edge of the input module and output module circuit boards.

Figure 2B:
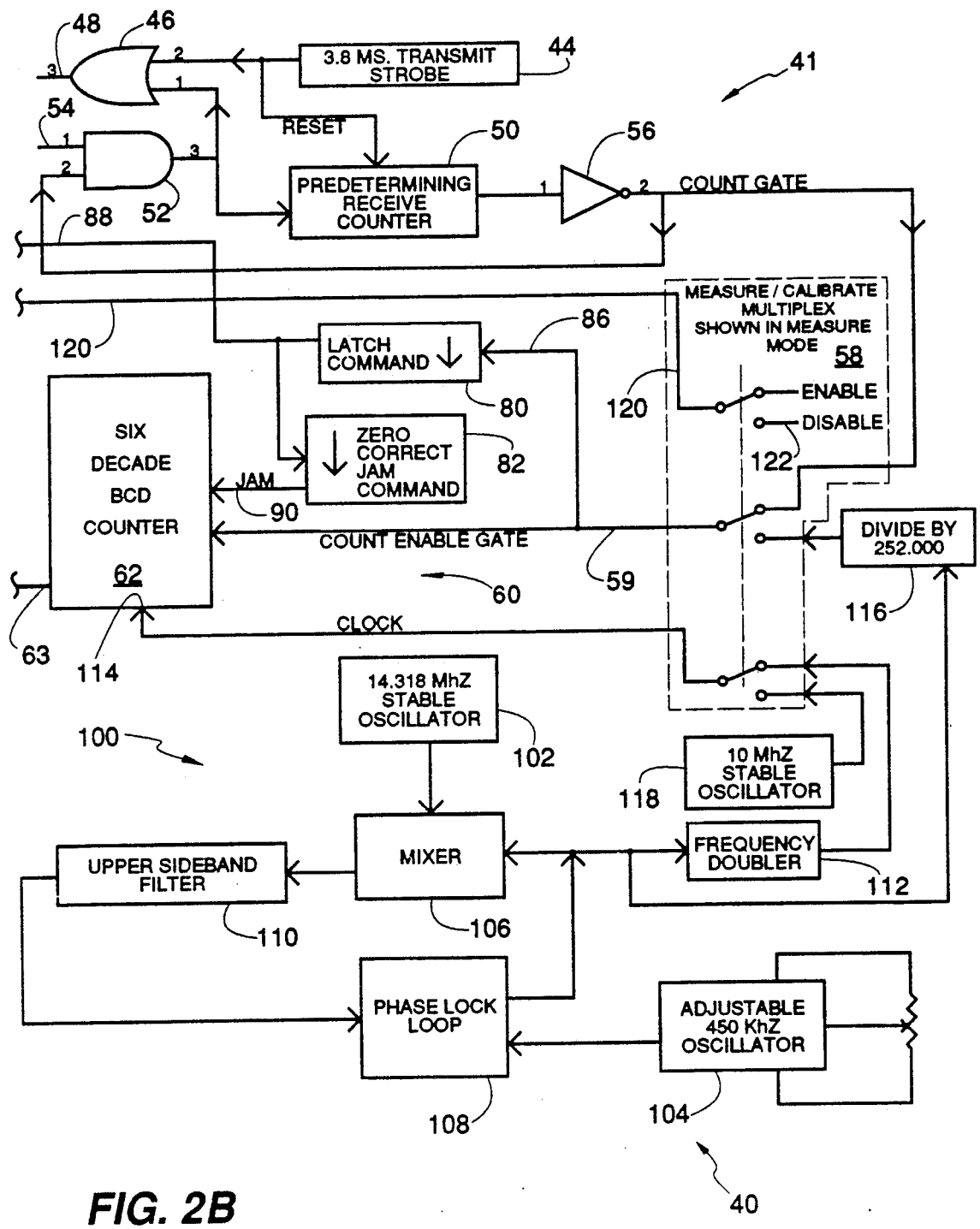
Figure 2A:
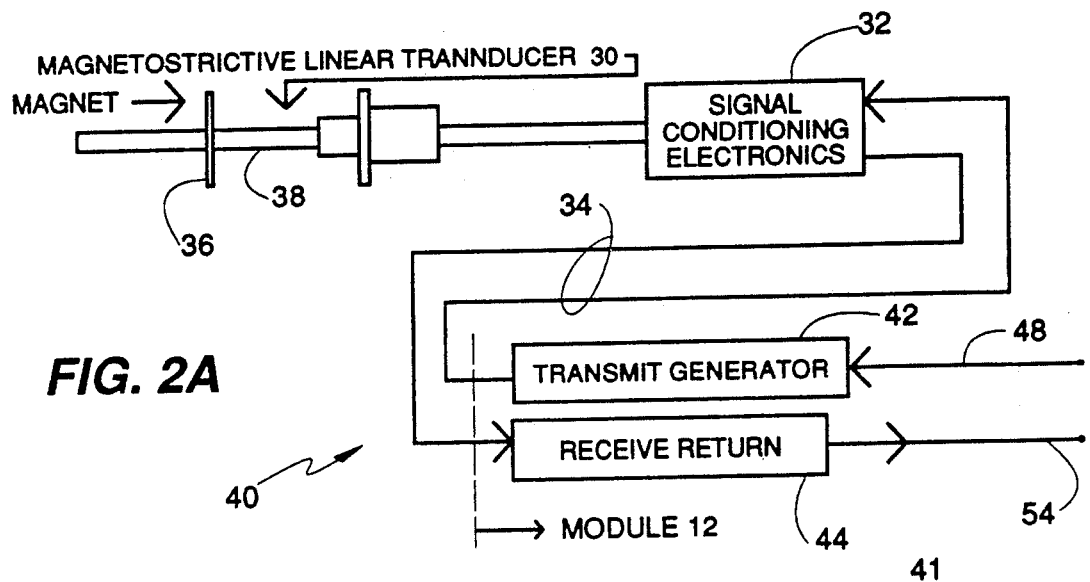
Figure 2D:
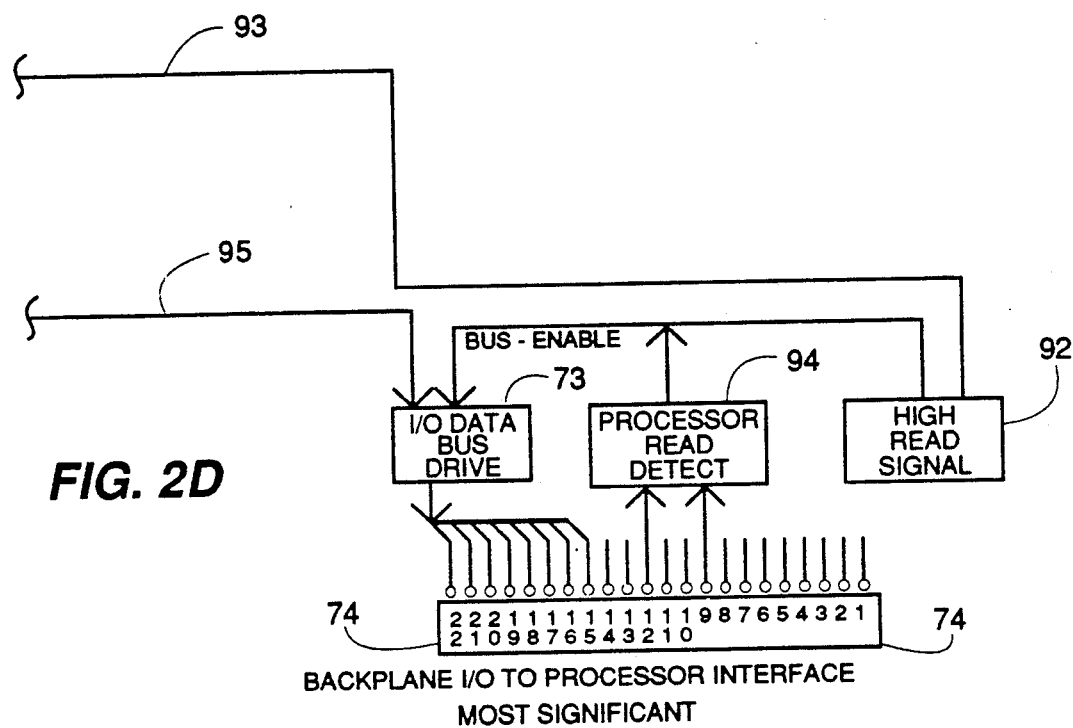

Power and control wiring, which is used to control a machine or process, are removably attached to the terminal block receptacles 28 on the front faces of the input modules 12, 18, and 20 and of the output modules 22 with the wiring intact The input modules 12, 18, and 20 and the output modules 22 form an interface between the processor module 16 and input and output devices. The input modules 18 are typically connected to switch-type devices such as photoelectric controls, switches, and proximity sensors The linear transducer input module 12 is connected to a magnetostrictive linear transducer 30 (FIG. 2A).

The input module 20 is typically connected to analog input signals such as load cells and pressure transducers The signals from a group of such sensing devices can be multiplexed to form words of digital data that are read by the processor 17.

Output modules 22 are typically connected to such devices as relays, contactors, solenoid valves, and motor starters to receive digital data from the processor 17 and to distribute or demultiplex this data in the form of command signals for operating the output devices.

In some embodiments, the output modules 22 may demultiplex and convert the output digital data from the processor 17 into analog signals for such devices as motor drives.

FIGS. 2A-2d are a block diagram of the preferred embodiment of the invention for magnetostrictive linear transducer input module 12.

Referring to FIG. 2A, the magnetostrictive linear transducer 30 shown therein is mounted firmly on a machine and is wired through multi-conductor connectors to a small signal conditioning module 32 that contains signal conditioning circuitry. The signal conditioning module 32 is wired via a multi-conductor connector and cable 34 to the linear transducer input module terminal blocks which are removable with wires attached. A magnet 36 is affixed to a movable part of a machine The magnetostrictive linear transducer comprises a metal tube 38 with a wire attached at the far end from the wire excitation potential. The near end of the tube 38 is attached to a torsion sensor (not shown).

As shown in FIG. 2A the signal conditioning module 32 is coupled through the multi-conductor cable 34 to the linear transducer input module 12 and more particularly to linear transducer input circuitry 40 therein. More particularly, the signal conditioning module 32 is coupled to signal receiving circuitry 42 forming part of the linear transducer input circuit 40.

The signal receiving circuitry 41 includes a transmit generator 42 which is coupled to the signal conditioning module 32 and a receive return 44 also coupled to the signal conditioning module 32 as shown in FIG. 2A.

A transmit strobe 44 (FIG. 2B) transmits a strobe signal through an OR gate 46 to an input line 48 to the transmit generator 42 which passes on the strobe signal to the signal conditioning module 32. The transmit strobe 44 is also connected to a reset input of a predetermining receive counter 50.

The signal receiving circuitry 41 further includes an AND gate which receives the receive return signal via a line 54 and supplies an output signal to the OR gate 46 and to the predetermining receive counter 50. The output from the predetermining receive counter 50 is inverted by an inverter 56 and the output from the inverter 56 defines a count gate signal which is passed through a measured calibrate multiplex switching circuit 58 which is shown in FIG. 2B in the measure mode, and is supplied via a count enable gate line 59 to data supply circuitry 60.

The data supply circuitry 60 includes a six-decade BCD counter 62 which is coupled via line 63 to six-decade BCD user offset add circuitry 64 (FIG. 2C) which in turn is connected to output registers 66 coupled to optical isolation output circuitry 68.

The six-decade BCD user offset add circuitry 64, the output registers 66 and optical isolation output circuitry 68 comprise coupling circuit means for coupling the output of the BCD counter 62 to data output lines 70 which are coupled through three I/O data bus drive circuits 71, 72 and 73 (FIG. 2D) to a backplane or I/O interface circuits 74 for interfacing with the processor 17 (FIG. 1).

The data supply circuitry 60 also includes a user offset adjust device 75 which includes a plurality, namely 6, thumbwheel switches 76, which enable a user to input a binary coded decimal offset into the data supply circuitry 60 for adding an offset to the linear transducer digitized input data received from the counter 62. For this purpose, the device 75 is coupled to the six-decade BCD user offset add circuitry 64, and the device 75 together with the circuitry 64 define user operable means for adding an offset adjust to the linear transducer digitized output data.

The linear transducer input circuitry 40 further includes a latch command circuit 80 and a zero correct jam command 82 which together with a position change lockout circuit 84, define synchronizing circuitry 86. As shown, the count enable gate line 59 is connected to an input of the latch command 80. The latch command 80 is then coupled via a latch command conductor line 88 (FIG'S. 2B and 2C) to the position change lockout circuit 84. The conductor line 88 is also connected to the zero correct jam command 82 which has an output 90 connected to the BCD counter 62. The position change lockout circuit 84 is also coupled to a low read circuit 91 via line 89 and a high read circuit 92 via line 93 which are connected to processor read detect circuits 94 coupled to the backplane or I/O interface circuits 74 which are coupled to the processor 17. The I/O data bus line circuits 71, 72 and 72 are connected by a bus 95 to the output lines 70.

The input circuitry 40 further includes a calibrating circuit 100 comprising a fixed oscillator 102, an adjustable oscillator 104, a mixer 106 and a phase lock loop 108. The oscillator 102 is connected to the mixer 108 as shown and the adjustable oscillator 104 is connected to the phase lock loop 108. The phase lock loop 108 has an input coupled through an upper sideband filter 110 to an output of the mixer 106 and an output that feeds back into the mixer 106 and which is supplied to a frequency doubler 112 that is connected through the switching circuit 58 to a clock input 114 of the counter 62 and to a divider 116 which, in the calibrate mode of switching circuit 58, is connected to count enable gate line 59.

A 10 MhZ stable oscillator 118 is provided which, when the switching circuitry 58 is in the calibrate mode, is connected to the clock input 114 of the counter 62.

In the operation of the input module circuitry 40, at fixed intervals, the 3.8 ms. transmit strobe 44 sends an enabling pulse to the transmit generator 42 (FIG. 2A) mounted in the input module 12, resets the predetermining receive counter 50, and sends a count enable signal.

A brief, high current pulse is then applied to the wire in the center of the magnetostrictive linear transducer 30 which causes an electro-magnetic field in the sensor tube 38. The electromagnetic field in the vicinity of the magnet 36 causes a torsion wave traveling at an approximate velocity of 1 inch per 9.1 microseconds to emanate in both directions from the magnet 36 along the longitudinal axis of the tube 38. At the far end of the tube 38 the torsion wave is damped out to prevent the supplying of false signals to the receive return 44 in the input module 12 while at the near end, the tube 38 is attached to a torsion sensor which converts the torsion wave to a voltage pulse.

The receive pulse is connected to the signal conditioning module 32 which amplifies the pulse and applies the pulse through the receive return 44 to one input of the logical AND gate 52.

Since the count gate signal is an enable signal, the AND gate 52 passes the receive pulse via the OR gate 46 to the transmit generator 42 which immediately causes a transmit pulse to be supplied to the magnetostrictive linear transducer 30.

The receive pulse from the AND gate 22 also increments the predetermining receive counter 50.

This transmit-receive-transmit sequence continues until the predetermining receive counter 50 attains its predetermined count at which time the count gate signal is disabled.

Assuming that the measure/calibrate multiplexer switching circuit 58 is in the measure mode as shown, the count gate signal is also used to enable the counting of approximately 27.7 MHz pulses from the frequency doubler 112 in the calibration circuit 100 by the six-decade BCD counter 62 in the data supply circuit 60 to which the doubler 112 is connected.

The length of time that the count gate signal is an enable signal is determined by the distance between the magnet 36 and the torsion wave sensor and the number of pulses that the predetermining receive counter 50 is allowed to count.

When the count gate signal makes the transition from enable to disable, the latch command circuitry 80 via the position change lockout circuitry 84 transfers the accumulated count from the six-decade BCD counter 62 plus the value of the user offset adjust added in circuitry 64 to the output registers 66.

Immediately after the data are latched, the zero correct jam command 82 issued a signal which presets the six-decade BCD counter 62 with a value that compensates for time delays that cause the count gate signal to be enabled slightly longer than the actual transmit-receive sequences.

The count accumulated by the six-decade BCD counter 62 is a function of zero compensation preset signal from jam command 82, the clock frequency, and the time duration of the count gate enable signal. The length of time that the count gate signal is enabled depends on the position of the magnet 36 and the velocity of the torsion wave along the longitudinal axis of the tube of the magnetostrictive linear transducer 30.

Since the velocity of the torsion wave varies by a small amount between various magnetostrictive linear transducers 30, the length of time that the count gate signal is enabled for a given position of the magnet 36 will also vary. To calibrate the linear transducer input module 12 to an individual magnetostrictive linear transducer 30 means that the clock frequency that is input to the six-decade BCD counter 62 must be matched to the transducer 30. On every magnetostrictive linear transducer 30 is a label on which appears the torsion wave velocity for that particular transducer. The nominal velocity of the torsion wave is 1 inch per 9.0136 microseconds. To calibrate the linear transducer input module 12 of the present invention, a switch (not shown) located on the top edge of the input module 12 is placed in the calibrate position which in turn causes the measure/calibrate multiplexer switching circuitry 58 to be placed in the calibrate mode.

In the calibrate mode, the count gate signal period varies as a function of the count frequency in the measurement mode and the six-decade BCD counter 62 is counting a 10 MHz stable, fixed rate clock. When the adjustable frequency 450-KHz oscillator 104 is adjusted during calibration, its output is fed to one input of the phase comparator section of the phase lock loop 108. The voltage controlled oscillator (VCO) section of the phase lock loop 33 free run frequency is approximately 13.87 MHz. The output of the phase comparator section of the phase lock loop 108 is coupled through a low-pass filter to the input of the VCO section to control the VCO frequency. The output of the VCO is coupled to the mixer 106 along with the output of the 14.318 MHz stable oscillator 102 which acts as the reference frequency The mixer 106 output contains both the sum and the difference of the 14.318 MHz reference frequency and the phase lock loop VCO output. The sum of the reference frequency and the VCO output frequency is filtered out by the upper sideband filter 110 which means that the reference frequency minus the phase lock loop VCO output frequency is applied to the other phase comparator input of the phase lock loop 108. The function of the phase comparator is to adjust the VCO frequency until both frequencies at its inputs are equal. The output, then, of the VCO is the 14.318 MHz reference frequency minus the frequency of the adjustable 450 KHz oscillator 104 which can be adjusted from 300 KHz to 600 KHz.

The VCO output frequency, which is used as the six-decade BCD counter clock signal after being doubled in frequency by the frequency doubler 112 in the measurement mode, can be adjusted from 13.718 MHz to 14.018 MHz.

In the calibrate mode the VCO output frequency is divided in divider 116 by 250,000 to provide a count gate enable which will vary from 9.11 to 8.92 milliseconds for the six-decade BCD counter 62 that is counting the 10 MHz stable oscillator 118.

Since the user offset adjust device 75 is disabled in the calibrate mode via a connection of an enable line 120 to a disable terminal 122 in the switching circuit 58, the output of the counter 62 is passed to the output registers 66, to an LED display 124 and to an auxiliary data output 126, is a direct indication of the calibration value which can be adjusted from one inch per 8.9171 to 9.1121 micro-seconds.

The adjustment range of the calibration circuit 100 in the linear transducer input module 12 is slightly greater than the variation in magnetostrictive linear transducers 30. If either the linear transducer input module 12, the signal conditioning module 32, or the magnetostrictive linear transducer 30 should have to be replaced while in service, only the defective part will need to be replaced because recalibration of the linear transducer input module 12 to match the particular magnetostrictive linear transducer 30 is easily and quickly accomplished The processor module 16 containing the processor 17 (FIG. 1) is connected via the backplane edge connectors to the linear transducer input module 12 in such a fashion as to be able to read 16 or more bits of data, eight bits at a time. The first reading of the linear transducer input module 12 fetches the lowest eight bits of position data, the next reading reads the next eight bits, until the final or most significant eight bits are read. When the "first processor read" in a sequence is detected by the low processor read detect circuits 91 and 94, the output registers 66 are inhibited from changing value by the position change lockout circuitry 84 until the last byte in a read sequence has been completed as detected by the high read signal circuit 92 and position change lockout circuit 84. Because changes in the position data are inhibited only while the processor 17 is actually reading that data, the processor 17 receives only the most recent position data. Further, there is also no need for the processor 17 to spend valuable computation time sending an inhibit command to the linear transducer input module 12.

We claim:

1. A linear transducer input module for use in a programmable controller that includes a processor module, said input module including signal receiving means for receiving position data signals from an externally located ultrasonic magnetostrictive linear transducer coupled to a linearly movable part of a machine, and position data supply means coupled to an output of said signal receiving means and having output circuitry for coupling to the processor module for supplying position data to the processor module of the programmable controller, said position data supply means including manually operable user offset adjust circuit means for adding a user offset to the position data.

2. The input module of claim 1 wherein said position data supply means includes coupling means including a counter having an input coupled to said output of said signal receiving means and an output coupled to said output circuitry.

3. The input module of claim 2 including synchronizing means for synchronizing the receiving of position data with an input fetch signal from the processor module, said synchronizing means comprising position change lockout circuitry coupled to said output circuitry and to circuitry for receiving the fetch signal from the processor module, and said receiving means being coupled to said position change lockout circuitry.

4. The input module of claim 2 wherein said coupling means includes said user offset adjust circuit means.

5. The input module of claim 4 wherein said coupling means includes BCD user offset add circuitry and said user offset adjust means includes means coupled to said BCD user offset add circuitry for inputting a binary coded decimal offset.

6. The input module of claim 5 wherein said means for inputting a binary coded decimal offset comprises a plurality of thumbwheel switches.

7. The input module of claim 5 wherein said output circuitry includes output registers and optical isolation circuitry coupled between said BCD user offset add circuitry and said output of said position data supply means.

8. The input module of claim 1 wherein said receiving means includes strobe signal transmitting means coupled to a strobe input of signal conditioning circuitry connected to the liner transducer.

9. The input module of claim 8 wherein said signal receiving means further includes a transmit generator coupled between said strobe transmitting means and said strobe input of said signal conditioning circuitry, a predetermining receive counter which is coupled between a receive return circuit coupled to a digitized position data output of said signal conditioning circuitry and a count gate line coupled to a counter and which has a reset input coupled to the output of said strobe signal transmitting means.

10. The input module of claim 9 wherein said signal receiving means further include a control circuit defined by an AND gate having one input coupled to said digitized position data output and an output coupled to an input of said predetermining receive counter.

11. The input module of claim 10 wherein said receiving means further include an OR gate having one input coupled to the output of said AND gate another input coupled to the output of said strobe transmitting means and an output coupled to the input of said transmit generator.

12. The input module of claim 1 including user operable calibrating means for calibrating said input module for an individual magnetostrictive linear transducer.

13. The input module of claim 12 including switching circuit means coupled between said receiving means and said data supply means and also being coupled to said calibrating means, said switching circuit means being user operable to place the input module in a Calibrate Mode where said receiving means are isolated from said supply means and a Measure Mode where said receiving means are coupled to said data supply means.

14. The input module of claim 13 wherein said position data supply means include a counter having an input coupled to said output of said receiving means and coupling means for coupling said counter to said output of said position data supply means, said counter having a clock input, and wherein said calibrating means comprises (a) a first oscillator having a stable oscillator output signal, (b) a second oscillator having an adjustable oscillator output signal, (c) means for multiplying said mixed oscillator output signals and (e) means for supplying said multiplied mixed oscillator output signals to said clock input of said counter.

15. The input module of claim 14 wherein said calibrating means further includes a phase lock loop circuit coupled in a loop with said mixer, said second oscillator being coupled to said phase lock loop circuit.

16. The input module of claim 15 wherein said calibrating means include an upper sideboard filter coupled in series with said mixer and said phase lock loop circuit.

17. The input module of claim 14 wherein said calibrating means are coupled, during a calibrate mode of operation, through a divider to said counter.

18. The input module of claim 1 including synchronizing means for synchronizing the receiving of position data with an input fetch signal from the processor module.

19. The input module of claim 18 wherein said data supply means include a counter and output registers coupled to said counter, and said synchronizing means include position change lockout circuitry for coupling to a processor in the processor module and for receiving from the processor the fetch signal, said lockout circuitry having an output coupled to said output registers for locking the contents of the registers with the last position data received therein.

20. The input module of claim 19 wherein said synchronizing means include latch command circuitry and zero command circuitry, said latch command circuitry being coupled to the output of said receiving means and to said zero command circuitry, and said zero command circuitry being coupled to said counter and to said position change lockout circuitry.

* * * * *